No. 615,727. Patented Dec. 13, 1898.
P. P. MAST.
GRAIN DRILL.
(Application filed Apr. 27, 1898.)
(No Model.) 2 Sheets—Sheet 2.
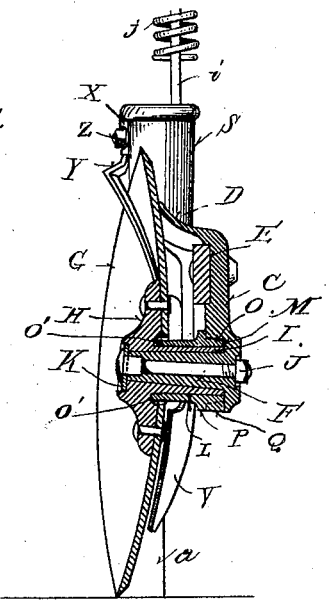
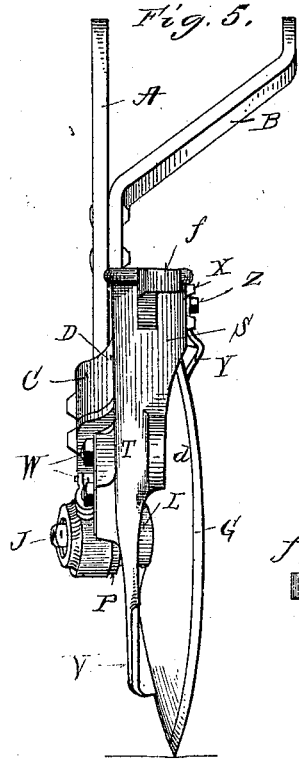
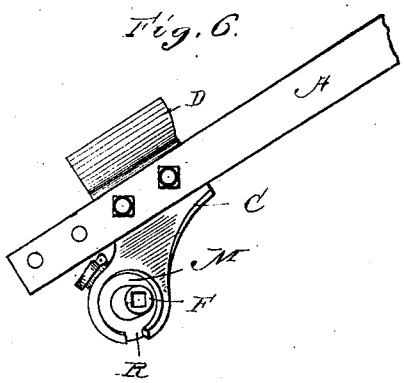
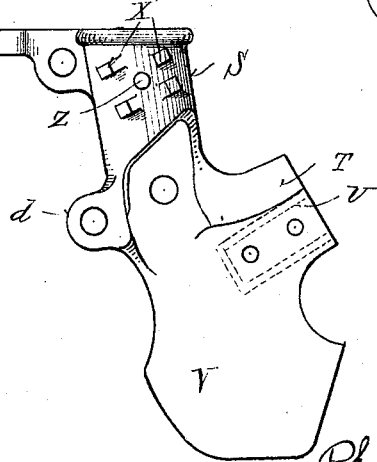
Witnesses
Jas. E. Dawley.
W. M. McNair.
Inventor
Phineas P. Mast,
By his Attorney
H. A. Toulmin

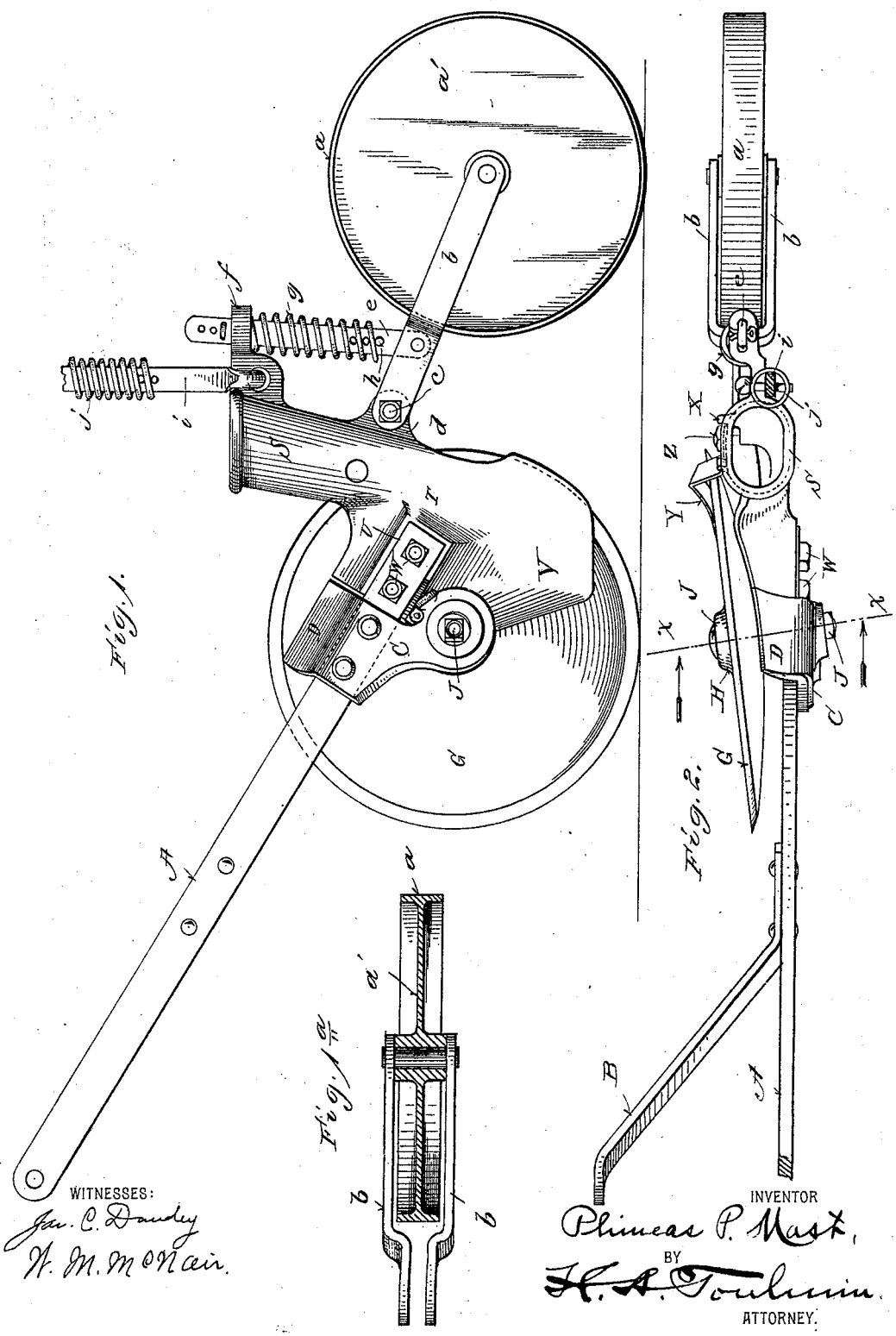

United States Patent Office.

PHINEAS P. MAST, OF SPRINGFIELD, OHIO, ASSIGNOR TO THE P. P. MAST & COMPANY, OF SAME PLACE.

GRAIN-DRILL.

SPECIFICATION forming part of Letters Patent No. 615,727, dated December 13, 1898.

Application filed April 27, 1898. Serial No. 678,936. (No model.)

*To all whom it may concern:*

Be it known that I, PHINEAS P. MAST, a citizen of the United States, residing at Springfield, in the county of Clark and State of Ohio, have invented certain new and useful Improvements in Grain-Drills, of which the following is a specification, reference being had therein to the accompanying drawings.

This invention relates to certain new and useful improvements in that class of seeding-machines known as "grain-drills;" and the particular feature of such machines to which my invention directly relates is the combined furrow-opening and seed-delivering device.

I am quite well aware that numerous and varied constructions and arrangements have been devised and disclosed in many Letters Patent heretofore granted and that among these have been shown and described furrow-opening and seed-delivering devices employing disks set so as to rotate in a plane at an angle to the line of draft and employing seed-delivering devices set behind and within the angle of the disks, so as to deliver the grain in the furrow, the lower part of such delivering devices being in some cases wing-like and substantially in contact with the disk along one edge of such wing and acting to keep the sod out of the furrow, and thereby assisting to render the furrow in good condition for the grain, and the wing also incidentally protecting the grain from outside influences during its descent into the furrow, and among the examples of such angularly-set disks with the delivering devices or tubes so set with relation to them I would mention Patent No. 277,982, granted May 22, 1883, to A. Bradford, for combined agricultural machines, and Patent No. 489,353, granted January 3, 1893, to W. Webster, for attachment for grain-drills, and among such examples of seed-delivering devices so related along one edge to the disks and so operating with respect to the furrow I would mention Patent No. 21,349, granted August 31, 1858, to McCormick and Baker, for grain-drills, and Patent No. 386,484, granted July 24, 1888, to A. C. McClelland, for grain-drills; but my invention, as to the first part of it, while including the art thus acknowledged and while performing these functions, is structurally different—namely, it consists of a drag-bar, a clip secured to one side of such bar and having a bearing-stud extending laterally from it and at an angle to the line of draft, and a disk mounted on such stud, the position of the clip on the bar enabling me to elongate the bearing formed by such stud, yet without going past or materially past the farther side of the disk, and of a winged tube secured to the said drag-bar upon the opposite side to that on which the clip is placed, whereby such tube and wing are brought in such proper relation to the disk. Thus by this new structural arrangement I have provided a novel way of mounting the disk on the bar to secure such extended bearing for the disk without carrying the bearing devices beyond or materially beyond the disk, but keeping them within the concavity of the disk, and a novel manner of securing the tube, with its wing, in the desired relation with respect to the disk.

The second feature of my invention consists in providing the disk-bearing with a stationary housing or casing which effectively prevents dust, grit, or mud from working into the interior of the bearing and causing the disk to run hard and the parts to wear and cut away, the detail peculiarities of which feature will be more fully explained hereinafter.

In the accompanying drawings, forming a part of this specification, and on which like reference-letters indicate corresponding parts, Figure 1 is a side elevation of my improved device; Fig. 1ª, a detail sectional and plan view of the press-wheel and its bars; Fig. 2, a plan view of the same; Fig. 3, a vertical sectional view on the line $x$ $x$ of Fig. 2, looking in the direction of the arrows; Fig. 4, a detail perspective view of the stationary housing or casing for the bearing; Fig. 5, a rear elevation of the device entire; Fig. 6, a detail view of the bar and clip and bearing-stud on the clip, and Fig. 7 a detail view of the winged seed-tube.

The letter A designates a drag-bar, with a brace B, adapted to be connected with the frame of a grain-drill and to be dragged along by the machine. In practice a complete machine will contain a number of these bars.

To each bar is secured, by means of bolts or otherwise, a clip C, preferably of cast-iron, which clip is formed with a projection D, extending over the bar and near to the disk to catch and dislodge any earth that may adhere to the outer part of the disk on the convex side. This clip is recessed, as shown at E, to receive the bar and make a stronger connection. It will be observed from Fig. 3 that the clip is on what may be called the "outside" of the bar and that the clip is provided with a stud in the nature of a bearing, being preferably tapered, and this bearing commences under and outside of the bar and thence extends laterally and at the same time slightly upward, so as to properly tip the disk from the true vertical. The bearing F also extends slightly forward, as indicated in Fig. 2, and more clearly seen in Fig. 6, so as to give the disk the angular position with respect to the draft-line. The letter G designates this disk, which is usually constructed of sheet-steel struck up into a concavo-convex form and properly sharpened at the periphery. The center of the disk is supplied by the hub H, which is extended beyond the disk toward the clip C, as seen at I. This hub is bored to fit the stud F, and a retaining bolt and nut J, with a washer K, serve to retain the disk-hub on such bearing. It will be seen that this bearing, while long, (approximately one-fourth of the diameter of the disk,) is still substantially within the concave side of the disk, and that notwithstanding such length of bearing it possesses the requisite rigidity and strength by reason of the projection F being part of the stout clip C. As a result of this construction I need only to attach the drag-bar on one side of the disk and make the drag-bar single rearward from the brace B. To protect this long bearing from dust, grit, and earth, I provide a housing or casing L in the form of a cast-iron tube, which fits snugly over the hub or the extension I of the hub and extends within the annular recess M in the clip, which recess is formed to receive the hub extension, as well as a protection O on the housing or casing. It is preferred to taper this recess M, as shown, and to likewise taper the part O of the housing or casing, so that it will fit the more snugly in the recess. It also extends some distance through the disk and into an annular recess O' in the hub and against the hub to completely exclude foreign matter. An annular bead or shoulder P on the housing or casing also fits snugly against the inside of the clip, immediately around the recess, while a lug or projection Q on the housing or casing enters a slot R in the clip and thus keeps the housing or casing from rotating. If it rotated, dust, grit, or earth would work in; but as it is stationary practice demonstrates that the bearing is by this means kept free of such foreign matter and is thus preserved against wear and made to run easily.

I will now refer to the seed-delivering attachment, which I mount on the drag-bar and carry by said bar, as before indicated. This device consists of a tube S, preferably of cast-iron, and of a plate portion T, formed with a recess (indicated by the line U) to receive the bar and with a wing-like portion V, which coöperates with the disk in delivering the seed into the furrow and which in those cases in which the disk runs deep enough in the soil to make a furrow which would tend to cave in also guards against such accident or incident similarly, so far as this is concerned, to the wing-like plates or parts of the seed-delivering devices acknowledged in the prior art. Bolts W or other means I employ to secure the bar in the seat U, and the plate T and the extension V being thus secured to the inside of the bar, while the clip is secured to the outside, they are brought in the proper relation to the convex side of the disk, so that the forward edge of the wing-like extension V will hug close to the disk, while the rear portion of the same will stand off from the disk, as required in this class of devices, as also indicated by the art as I have acknowledged it above, but in which art my peculiar structural arrangement was absent, and in accordance with which structural arrangement I find my device to be successful in use and economical in manufacture.

In using my device I sometimes, though not always, attach thereto what is known as a "press-wheel" in this art, and I have illustrated in Figs. 1 and 2 such press-wheel and the devices for attaching it to my grain or seed tube. This wheel trails behind and is intended to re-cover or fill in the furrow and to properly pack the soil. It is shown at $a$ and is mounted on an axle carried by bars $b$, which bars are pivoted at $c$ to a lug $d$ on the rear of the tube. A spring pressure device to press the wheel upon the ground is composed of a bar $e$, pivoted to the bars $b$ and extended through a lug $f$ on the upper part of the tube, with a spiral spring $g$ acting between such lug and a pin $h$, so as to exert a force downward on the wheel $a$. In grain-drills it is usual to supply a spring operating means for pressing down more or less upon the furrow-making disks. A rod $i$, pivoted to the upper part of the tube S, and a spring $j$, which spring is operated by a mechanism not shown, I employ for this purpose.

On what may be termed the "inside" of the tube I have provided lugs X, between which I place a spring-scraper Y, held by a nut and bolt Z, so as to spring against the inside of the disk. This scraper being located back of the center of the disk dislodges the adhering soil before the latter passes over the center of the disk and thus deposits the removed soil down upon the grain. Thus it will be seen that I have provided a combined furrow-opening and seed-delivering device of a novel construction. The clip and bar I construct and arrange to carry the disk. The tube with its plate-like part and extension I arrange and provide to receive and deliver the grain into the furrow, and while this function is not new, as the prior art shows, still my way of making this tube with its plate and extension and attaching it to the inside of the bar is new and a valuable and useful mode of construction. Furthermore, my improved bearing has the two qualities of being elongated without projecting too far from the inside of the disk, such elongation being due to the use and position of the clip, and of being proof against grit, dust, &c. I regard myself as the first to combine with a disk-bearing the stationary housing or casing. Among other advantages of this device it may also be mentioned that in case of breakage of the disk-bearing only a new clip is needed, as such breakage will not affect the tube and its wing-like extension. Again, as my drag-bar is a single straight piece no trash or weeds can adhere to it, yet; as I have constructed my device, the fact that the bar is single does not impair the general strength and rigidity of the entire structure. It will further be seen from Fig. 2 that the disk, the delivery-tube, and the wheel are substantially in line, the wheel being brought over to the right position by reason of the lug $d$ being located as shown in Fig. 5.

Referring again to the press-wheel $a$, it will be seen from Fig. 1ª that from the ring to the hub it is composed of an unbroken plate or web $a'$. This feature in a press-wheel with the wheel-bars $b$ alongside of the wheel is useful and important in preventing the press-wheel from becoming clogged by the working of trash, weeds, and other rubbish through the wheel and across the wheel-bars. There are no openings or spaces leading laterally through the wheel, as between the spokes, to expose the wheel to liability or certainty to clog and to stop rotating. With my wheel thus made with its unbroken web $a'$, combined with these bars, no clogging can happen.

Having thus fully described my invention, what I claim as new, and desire to secure by Letters Patent, is—

1. In a furrow-opening and seed-delivering device, the combination with a drag-bar, and a clip secured on the outside thereof and depending below it, and a bearing extending from said clip from a point outside of and under said bar, of a disk having a hub mounted on such bearing and means to secure it thereon.

2. In a furrow-opening and seed-delivering device, the combination with a drag-bar, and a clip secured thereto and having a projection forming a bearing, of a disk mounted and retained upon said projection, and a stationary housing or casing between the disk and clip and enveloping the bearing devices.

3. In a furrow-opening and seed-delivering device, the combination with a drag-bar and a disk mounted upon a bearing carried thereby, of a stationary housing or casing enveloping said bearing.

4. In a furrow-opening and seed-delivering device, the combination with a drag-bar and a disk mounted on a bearing carried by the bar, the disk having a hub rotating on the bearing, of a stationary housing or casing covering such hub and extending from beyond the disk to the bearing-support.

5. In a furrow-opening and seed-delivering device, the combination with a drag-bar, a clip secured to one side of it and having a bearing, and a disk mounted and retained on such bearing, of a seed-tube having a plate part with an extension, and secured to the other side of said bar and more nearly to the disk than said clip.

6. In a furrow-opening and seed-delivering device, the combination with a seed-tube having a plate part with an extension, and a clip, of a drag-bar on the inside of the clip and on the outside of said plate part of the tube, and means to secure the same to said bar.

7. In a furrow-opening and seed-delivering device, a clip having an extension forming a bearing and a recess round such extension and a slot, of a housing or casing adapted to envelop the bearing, extending within such recess and engaging with such slot, and a disk having a hub which extends between the housing or casing and such extension and fits upon the latter.

8. In a furrow-opening and seed-delivering device, the combination with a drag-bar, and a clip secured to it having a bearing and a disk mounted and retained on such bearing, of a separate seed-tube secured to said bar and having a plate part with an extension.

9. In a furrow-opening and seed-delivering device, the combination with a bearing with an annular recess around one end of it, of a disk having a hub mounted on said bearing, the hub having an annular recess therein extending back of the disk, and a stationary casing or housing enveloping said hub and extending into both of said annular recesses.

10. In a furrow-opening and seed-delivering device, the combination with a drag-bar, of a clip secured thereto, said clip extending below and above said bar, and a bearing carried by said clip, of a disk mounted on said bearing and having its convex side in close proximity to that part of said clip which extends over the bar.

11. In a furrow-opening and seed-delivering device, the combination with a drag-bar and a bearing secured thereto, of a disk mounted on said bearing, and a clip secured to said bar and having a projection extending up close to the upper part of the disk on the convex side and adapted to catch and dislodge any earth that may adhere to the outer part of the disk on the convex side.

12. In a furrow-opening and seed-delivering device the following instrumentalities: a drag-bar, a clip secured to one side of it and carrying a bearing beneath the bar and having a lateral projection above the bar, a disk mounted on said bearing, a stationary housing or casing enveloping the bearing, a tube with a plate part and an extension also secured to the drag-bar and located nearer to the disk than the clip, lugs on the tube, wheel-bars pivoted to one lug, a wheel mounted in said bars, a rod guided by the other lug and connected to the wheel-bars, and a spring acting downward from such lug upon such rod, said disk, tube and press-wheel being substantially in line.

In testimony whereof I affix my signature in presence of two witnesses.

PHINEAS P. MAST.

Witnesses:
C. C. KIRKPATRICK,
J. SHAW.